J. E. HETTINGER.
COOKING UTENSIL.
APPLICATION FILED MAY 12, 1919.

1,323,473. Patented Dec. 2, 1919.

Witness:
R. Burkhardt.

Inventor:
Julius E. Hettinger,
By Albert C. Bell,
Atty.

UNITED STATES PATENT OFFICE.

JULIUS E. HETTINGER, OF CHICAGO, ILLINOIS.

COOKING UTENSIL.

1,323,473.         Specification of Letters Patent.         Patented Dec. 2, 1919.

Application filed May 12, 1919. Serial No. 296,564.

*To all whom it may concern:*

Be it known that I, JULIUS E. HETTINGER, a citizen of the United States, residing at Chicago, in the county of Cook and State of Illinois, have invented a certain new and useful Improvement in Cooking Utensils, of which the following is a specification.

My invention relates to an improved form of cooking utensil in which an inner inclosed vessel is provided for containing the food to be cooked, which vessel is contained in an outer vessel in which water is placed, so that when the outer vessel is heated the water is converted into steam and the heat of the steam becomes effective to cook the food in the inner vessel. Each vessel is tightly closed by a cover held in place by suitable fastening devices and the inner vessel is separated at all points from the outer vessel so that it is entirely surrounded by steam during the cooking operation. The inner vessel is provided with a passageway extending centrally therethrough so that the steam developed in the outer vessel may pass through the passageway and thus cook the food not only from the outside of the mass of the food but centrally as well, and as a result the food is more thoroughly cooked in a shorter time and with a more palatable flavor than is possible where the food is cooked wholly by the application of heat externally.

My invention will best be understood by reference to the accompanying drawings showing a preferred embodiment thereof in which—

Similar numerals refer to similar parts throughout the several views.

Figure 1:
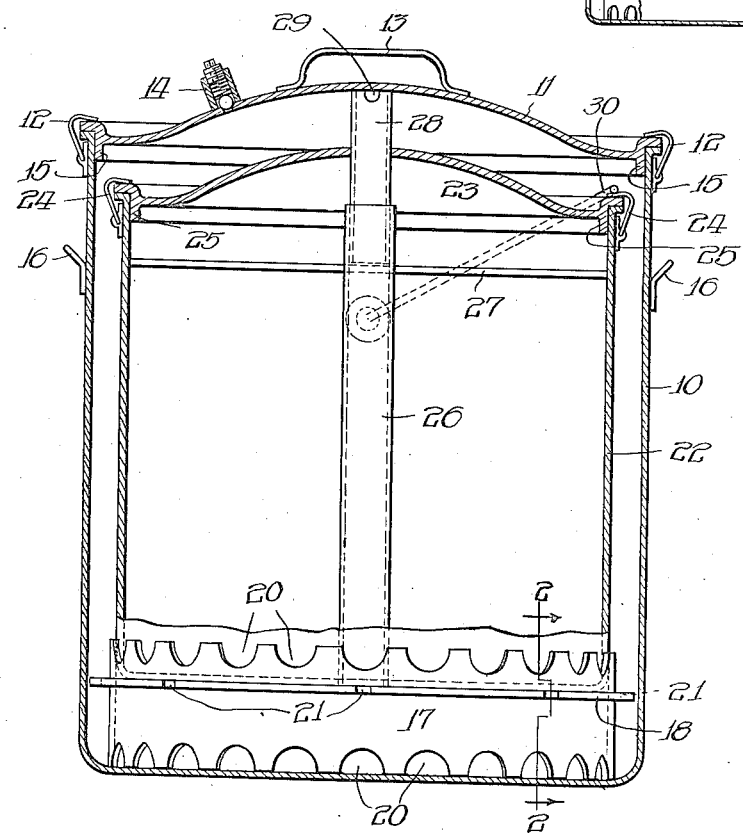
Figure 1, shows my device complete in vertical central sectional view.
Figure 2:
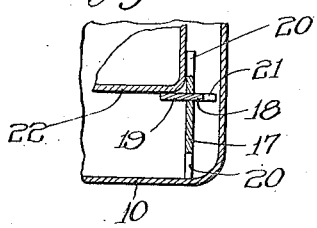
Fig. 2, is a sectional view of a portion of the device shown in Fig. 1 taken along the line 2—2.

As shown in Figs. 1 and 2, my improved cooking utensil consists of an outer vessel 10 of cylindrical form provided with a cover 11, held in place upon the upper end of the vessel 10 by means of suitable fastening devices 12. The cover 11 is provided with a handle 13 for conveniently removing it and the cover is also provided with an adjustable safety valve 14 so that the steam pressure generated in the vessel 10 may not become excessive. The cover 11 is provided with a depending flange 15 which closely fits the upper end of the vessel 10 and insures a close accurate fit between the cover and the vessel so that there will be no leakage of steam from the vessel. The vessel 10 is preferably provided with handles 16 for convenience in moving the vessel and contents from one position to another.

On the bottom of the vessel 10 a supporting ring 17 is disposed for the purpose of supporting the inner or cooking vessel in place. The ring 17 is provided with an outwardly extending flange 18 near its upper end for maintaining the ring 17 centrally in the vessel 10. As more clearly shown in Fig. 2 the ring 17 is also provided with an inwardly extending flange 19 for supporting the inner cooking vessel. The ring 17 is provided around its lower edge with apertures 20 and the outwardly projecting flange 18 is preferably provided at its edge with apertures 21 to permit a free circulation of the water and steam.

The inner or cooking vessel 22 is of the same general conformation as the outer vessel 10 and is supported on the inwardly projecting flange 19 and is held centrally in the outer vessel 10 by the upper portion of the ring 17. The vessel 22 is provided with a cover 23 of the same general conformation as the cover 11 which cover 23 is preferably held in place on vessel 22 by means of suitable fastening devices 24. The cover 23 is provided with a depending flange 25 closely fitting the upper end of the vessel 22 so that on the one hand all of the vapors and aroma of the food being cooked may be retained and on the other hand that the steam contained between the two vessels may not enter the vessel 22. A tube 26 is secured in the bottom of the vessel 22 and extends centrally and upwardly in said vessel to near the upper end of the same and the upper end of said tube is supported and held in place by a transverse rod 27 preferably extending from side to side of the vessel 22 and through the tube 26. The cover 23 is provided centrally with a tube 28 of an external diameter closely fitting the internal diameter of the tube 26, and the tube 28 is of such a length that its upper end is just inside of the inside of the cover 11. An aperture or apertures 29 are preferably provided in the upper end of tube 28 to permit the steam passing up through the tube 26 and the tube 28 to escape into the space between the two vessels. The tubes 26 and 28 are preferably of a diameter that will permit the ready flow upward through the vessel 22 of steam from the lower part of the vessel 10 and yet of not such a large diameter as to permit the passage through said tubes of a large amount of heat that will not be applied to the food being cooked in the vessel 22. The vessel 22 is provided with a handle or bail 30 for removing the vessel from the vessel 10 and inserting it into the vessel 10 as desired.

I find it desirable in practice to line the vessel 22 with vitreous material such as enamel or so-called granite or agate, so that no deleterious substances may be imparted to the food being cooked. The construction of the vessel 10 is immaterial as long as it is of sufficient rigidity and strength to contain the steam pressure used safely, and at the same time to be serviceable.

In using my improved device the food to be cooked is placed in the inner vessel 22, the cover 23 is firmly secured in place, care being taken that only the desired amount of moisture shall be contained in the food that it is intended to have therein when the food is cooked and then the inner vessel 22 is placed in the outer vessel 10 on the supporting ring 17. Water is placed in the outer vessel 10 but preferably not of a height to reach the bottom of the vessel 22 and then the cover 11 is firmly secured in place by means of the fastening devices 12. When the outer vessel 10 is heated sufficiently to turn the water contained therein into steam, the steam passes upwardly through the tubes 26 and 28 and also upwardly around the vessel 22, and thus completely surrounds the vessel 22 as a result of which heat is uniformly imparted to the food in the vessel 22 not only externally from all directions, but also in all directions internally. The result is that the food is uniformly cooked in a short time and no part of the food is overcooked with a resulting loss of flavor. Furthermore no part of the juices or volatile parts of the food are lost as the food is closely contained in the vessel 22 without the possibility of escape of vapors from said vessel. Food cooked in my improved device is not only more palatable as described, but is also more readily digested. Said food does not experience undesirable chemical changes as a result of being over cooked. It will be understood that the temperature of the cooking may be modified within certain limits by adjusting the safety valve 14.

Figure 3:
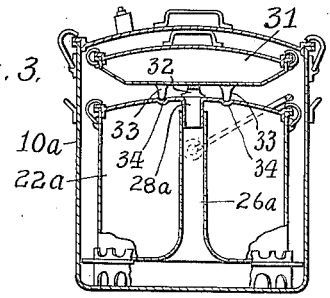
Fig. 3 is a view similar to Fig. 1 to a reduced scale of a modified construction.

In the modified construction shown in Fig. 3, the outer vessel $10^a$ is substantially the same as the vessel 10 shown in Fig. 1. The inner vessel $22^a$ is of the same general construction as the vessel 22 and is supported in the vessel $10^a$ in the same manner as is the vessel 22, the difference in construction being that it is not so high, relatively to the outer vessel, and its central tube $26^a$ flares outwardly at its lower end. The cover of the vessel $22^a$ is similar to the cover 23, the differences being that the tube $28^a$ secured thereto ends at the outer surface of said cover, a flat handle 32 is secured thereto extending over the open upper end of said tube $28^a$, and depressions or seats 34, 34 are formed thereon on either side of the handle 32 to receive the lower ends of the feet 33, 33 of a second inner vessel 31 contained in the vessel $10^a$ above the vessel $22^a$. The vessel 31 is supported by the handle 32 and the feet 33, 33; the seats 34, 34, center the vessel 31 in the vessel $10^a$ and prevent displacement of the vessel 31.

The vessels $10^a$, $22^a$ and 31 are provided with covers and fastening devices of the kind shown and described in connection with Fig. 1. The cover of the vessel 31 is provided with a handle engaged by the cover of the vessel $10^a$ when the latter is in place, whereby the inner vessels are securely held in proper relative position during a cooking operation so that steam readily comes in contact with each inner vessel on all sides. As shown in Fig. 3, the vessel 31 is relatively shallow and is not therefore provided with a central tube. It will be understood that, if preferred, both inner vessels may be of the construction shown for the vessel 22 or the vessel $22^a$, or if desired, several vessels 31 may be used, depending on the nature of the cooking or baking to be done. By giving the vessels and fastening devices sufficient strength, and adjusting the safety valve for high pressure, practically any desired temperature necessary in cooking and baking may be attained.

Whatever arrangement of vessels is employed, the operation and advantages are as described above. When a construction of the kind shown in Fig. 3 is employed, pungent and delicate foods may be cooked at the same time since the odors from one food cannot come in contact with the other food.

While I have shown my invention in the particular embodiment above described I do not however limit myself to this exact construction as I may employ equivalents thereof known to the art at the time of the filing of this application without departing from the scope of the apended claims.

What I claim is:

1. In a cooking utensil, the combination of an outer closed vessel, a support on the bottom of said vessel, an inner closed vessel within said outer vessel and separated therefrom on all sides, a passageway extending through said inner vessel and opening only into said outer vessel, a cover for each of said vessels, each of said covers having a depending flange closely fitting the upper end of the corresponding vessel, fastening devices for holding said covers tightly in place on said vessels, said passageway comprising a vertical tube having a first portion centrally disposed in said inner vessel and having its lower end secured to the bottom of said inner vessel, a rod extending across the upper portion of said inner vessel supporting said first portion in said position and a second portion extending centrally through the cover of said inner vessel and forming a sliding fit with said first portion within said inner vessel.

2. In a cooking utensil, the combination of an outer closed vessel, a support on the bottom of said vessel, an inner closed vessel within said outer vessel and separate therefrom on all sides, a passageway extending through said inner vessel and opening only into said outer vessel, a cover for each of said vessels, each of said covers having a depending flange closely fitting the upper end of the corresponding vessel, fastening devices for holding said covers tightly in place on said vessels, said passageway comprising a vertical tube having a first portion centrally disposed in said inner vessel and having its lower end secured to the bottom of said inner vessel, a rod extending across the upper portion of said inner vessel supporting said first portion in said position, a second portion extending centrally through the cover of said inner vessel and forming a sliding fit with said first portion within said inner vessel, said support comprising a perforated ring having outer projections centering said support in the outer vessel and a seat for holding the inner vessel centrally in the outer vessel.

3. In a cooking utensil, the combination of an outer vessel, a plurality of inner vessels, means for independently inclosing said vessels to withstand steam pressure, said inner vessels being separated on all sides from said outer vessel and from each other, and a passageway extending through one of said inner vessels and opening at its end into said outer vessel, said passageway comprising a tube extending vertically and centrally through the corresponding inner vessel, said tube comprising a first portion carried by the bottom of said inner vessel and a second portion closely fitting said first portion in sliding engagement and carried by the inclosing means of said inner vessel.

4. In a cooking utensil, the combination of an outer vessel, an inner vessel, and means for independently inclosing said vessels to withstand steam pressure, said vessels being separated on all sides from each other, and a passageway extending through said inner vessel and opening at its ends into said outer vessel, said passageway comprising a tube extending vertically and centrally through said inner vessel, said tube having a first portion secured to the bottom of the inner vessel and a second portion in close sliding engagement with said first portion and carried by the inclosing means of said inner vessel.

In witness whereof, I hereunto subscribe my name this 7th day of May A. D. 1919.

JULIUS E. HETTINGER.